BROAD-BAND MANY-DECADE LOGARITHMIC AMPLIFIER

Filed Dec. 19, 1962 2 Sheets-Sheet 1

United States Patent Office 3,234,404

Patented Feb. 8, 1966

3,234,404
BROAD-BAND MANY-DECADE LOGARITHMIC AMPLIFIER

David L. Peters, East Northport, N.Y., assignor to Hazeltine Research Inc., a corporation of Illinois Filed Dec. 19, 1962, Ser. No. 245,755
7 Claims. (Cl. 307—88.5)

Figure 1:
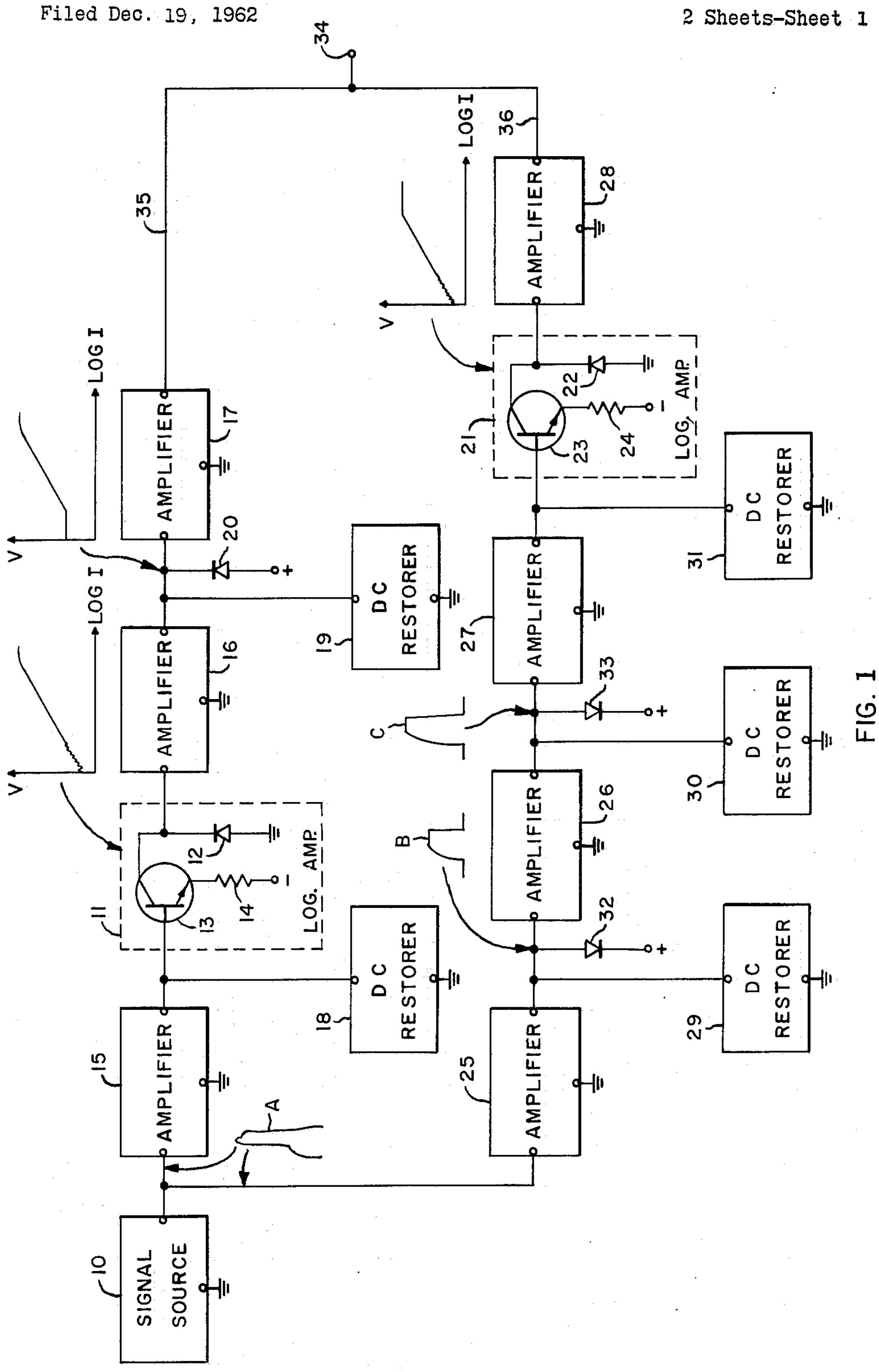

The present invention relates to a logarithmic amplifier having a characteristic which is logarithmic over a relatively wide frequency range for input signals whose amplitudes may vary over an extended amplitude range.

In one well-known form of a logarithmic amplifier, a silicon or similar type diode is placed across the output terminals of a transistor. Such a diode has been found to have a very nearly exponential variation of current with voltage or logarithmic variation of voltage with current. The transistor serves to translate the input voltage which is to be logarithmically amplified into a current which is then supplied to the diode.

A major shortcoming of this logarithmic amplifier is that for broad-band applications, the amplifier characteristic in logarithmic only over a limited range of amplitudes of the input signal. If the amplitude of the input signal exceeds a value, which will be referred to in the remainder of this specification as the maximum value (M.V.), the physical characteristics of the diode are such that the voltage across the diode is no longer logarithmically related to the current supplied to the diode. On the other hand, if the amplitude of the input signal falls below a minimum value, which will be referred to in the remainder of this specification as the threshold level (T.L.), the physical characteristics of the diode are such that the characteristic of the logarithmic amplifier is logarithmic only over a relatively narrow frequency range for input signals lying below this threshold level. It has been found that with the best diodes, this logarithmic amplifier will have a logarithmic characteristic over a 6 mc. frequency range only over a two and one-half decade amplitude range.

It is an object of the present invention to provide a new and improved logarithmic amplifier which has a characteristic which is logarithmic over a relatively wide frequency range for input signals whose amplitudes may vary over an extended amplitude range.

It is another object of the present invention to provide a new and improved logarithmic amplifier which is not subject to the above-mentioned shortcomings and limitations.

In accordance with the present invention, a broad-band many-decade logarithmic amplifier comprises means for supplying input signals and first circuit means, including a first logarithmic amplifier having a characteristic which is logarithmic only over a relatively narrow frequency range for input signals below a particular level, responsive to said input signals for logarithmically amplifying input signals above the aforementioned particular level. This logarithmic amplifier further comprises second circuit means, including a second logarithmic amplifier, responsive to the input signals for logarithmically amplifying input signals below the aforementioned particular level and means for combining the outputs from the first and second circuit means.

For a better understanding of the present invention, together with other and further objects thereof, reference is had to the following description taken in connection with the accompanying drawings, and its scope will be pointed out in the appended claims.

Figure 2A:
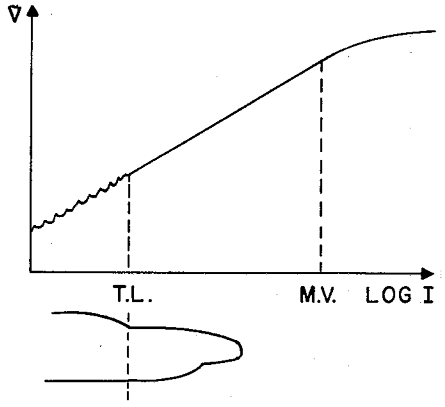
Figure 2B:
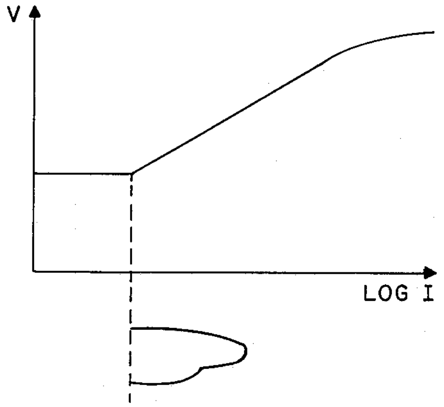
Figure 2C:
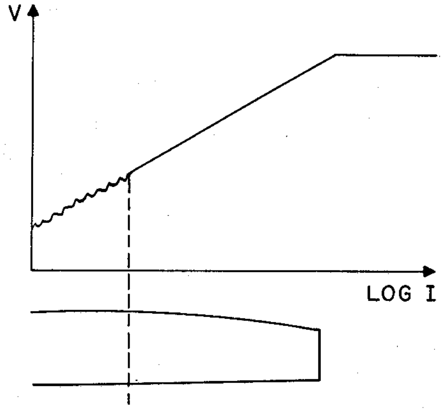

Referring to the drawings:

FIG. 1 shows a broad-band many-decade logarithmic amplifier constructed in accordance with the present invention along with appropriate characteristic curves and wave shapes which will aid in understanding the operation of the invention, and FIGS. 2*a*–2*c*, inclusive, show these characteristic curves and wave shapes in more detail.

*Description of the invention*

A broad-band many-decade logarithmic amplifier constructed in accordance with the present invention includes means for supplying input signals. This means is represented in FIG. 1 by a signal source 10 which may be any source or signal generator capable of supplying signals which are to be logarithmically amplified.

The logarithmic amplifier constructed in accordance with the present invention further includes first circuit means including a logarithmic amplifier 11. Logarithmic amplifier 11 is of the type previously mentioned wherein a diode 12 is connected across the output terminals of a transistor 13. Diode 12, which may be a silicon or similar type diode, is so polarized that during normal operation it conducts in the forward direction. Specifically, the anode of diode 12 is connected to ground and its cathode is connected to the collector electrode of transistor 13. This polarization is determined by the fact that transistor 13 which supplies current to diode 12 is shown as being an NPN transistor. The emitter electrode of transistor 13 is connected to a source of negative potential through a resistor 14 so as to provide the transistor with the proper bias.

The first circuit means may also include a number of amplifiers 15, 16 and 17 and a pair of D.C. restorers 18 and 19 all of conventional construction and operation. The first circuit means may further include a first clipping circuit composed of a diode 20 and a source of positive potential to which the anode of diode 20 is connected.

The logarithmic amplifier constructed in accordance with the present invention further includes second circuit means including a second logarithmic amplifier 21. Logarithmic amplifier 21 is also of the type previously mentioned wherein a diode 22 is connected across the output terminals of a transistor 23. Specifically, the anode of diode 22 is connected to ground while its cathode is connected to the collector electrode of transistor 23. The emitter electrode of transistor 23 is connected to a source of negative potential through a resistor 24 so as to provide the transistor with the proper bias.

The second circuit means may also include a number of amplifiers 25, 26, 27 and 28 and a number of D.C. restorers 29, 30 and 31 all of conventional construction and operation. The second circuit means may further include a second clipping circuit composed of a pair of diodes 32 and 33 and a pair of sources of positive potential to which the cathodes of diodes 32 and 33 are connected.

The logarithmic amplifier constructed in accordance with the present invention finally includes means for combining the outputs from the first and second circuit means. This combining means may include an output terminal 34 and a pair of wires 35 and 36 connected between terminal 34 and amplifiers 17 and 28, respectively.

*Operation of the invention*

As previously mentioned, logarithmic amplifiers having a construction similar to that of logarithmic amplifiers 11 and 21, suffer from the shortcoming that their characteristic is logarithmic only over a relatively narrow frequency range for input signals having amplitudes lying below the threshold level. FIG. 2*a* shows the characteristic of such a logarithmic amplifier on a logarithmic plot. Specifically the ordinate is a linear scale while the absicissa is a logarithmic scale. The straight-line portion of this characteristic corresponds to the usable range, namely that range over which the logarithmic amplifier logarithmically amplifies all signals over a wide range of frequencies. This straight-line portion would be logarithmic on a linear set of axes. The nonlinear portion of the characteristic shows that the output voltage is no longer logarithmically related to those input signals whose amplitudes exceed the maximum value (M.V.) previously mentioned. The jagged portion of the characteristic is intended to represnt the fact that the characteristic is logarithmic only over a relatively narrow frequency range for input signals whose amplitudes lie below the threshold level (T.L.).

In the present invention the first circuit means, including logarithmic amplifier 11, serve to logarithmically amplify input signals lying above the threshold level and below the maximum value over a relatively wide frequency range, while the second circuit means serve to logarithmically amplify input signals lying below the threshold level over the some relatively wide frequency range.

Wave shape A, shown in FIG. 1 at the junction of amplifiers 15 and 25, represents a typical signal which may be supplied by signal source 10 for logarithmic amplification by the broad-band many-decade logarithmic amplifier constructed in accordance with the present invention. Amplifier 15, amplifies the input signal supplied by signal source 10 to a suitable level and supplies this amplified signal to logarithmic amplifier 11 for logarithmic amplification. The characteristic curve of logarithmic amplifier 11 is shown in FIG. 1 with a lead arrow running from the curve to logarithmic amplifier 11. Since the characteristic of logarithmic amplifier 11 is not logarithmic over a wide frequency range for those signals supplied to it whose amplitudes lie below the threshold level, some of the amplifications developed by logarithmic amplifier 11 will not be logarithmic. In particular, those portions of the wave shape shown in FIG. 2*a*, lying below the threshold level will not be logarithmically amplified over a wide frequency range.

The first clipping circuit composed of diode 20 and the source of positive potential to which the anode of diode 20 is connected, serves to remove all amplifications, logarithmic or otherwise, developed by logarithmic amplifier 11 from signals, whose amplitudes, after amplification by amplifier 15, lie below the threshold level. This is accomplished by adjusting the source of positive potential to a value equal to the amplitude of the logarithmic amplifications developed from those signals supplied to logarithmic amplifier 11 which are equal to the threshold level. FIG. 2*b* depicts this clipping function. Only the amplifications developed from those portions of the signal lying above the threshold level are permitted to pass by the first clipping circuit. The curve shown in FIG. 1 with a lead arrow running to the cathode of diode 20 and the curve shown in FIG. 2*b*, represent the over-all characteristic curve for the first circuit means. The horizontal straight-line portion of this characteristic curve represents the clipping function.

It should be pointed out that the clipping function may be performed prior to logarithmic amplification. In this case, the source of positive potential of the clipping circuit would be adjusted to a value equal to the threshold level. The particular choice of location of the clipping function is determined by such practical considerations as performing the clipping at a suitable level.

Amplifier 16 serves primarily as a high impedance network for sampling the output of diode 12. Amplifier 17 serves as a current amplifier for those signals passed by the first clipping circuit and supplies these amplifications to the output terminal 34. The D.-C. restorers 18 and 19 are only necessary if the coupling between the various stages in the first circuit means is A.-C. coupling.

Thus, to summarize the performance of the first circuit means, the output of amplifier 17 is composed of logarithmic amplifications developed from those portions of the signal supplied to logarithmic amplifier 11 which lie above the threshold level. Furthermore, these logarithmic amplifications may be over a relatively wide frequency range since the operation is confined to the straight-line portion of the characteristic curve.

Amplifier 25 amplifies input signals supplied by signal source 10 to as high a level as possible and supplies these amplified signals to the second clipping circuit composed of diodes 32 and 33 and the sources of positive potential to which the cathodes of diodes 32 and 33 are connected. The second clipping circuit serves to remove all amplifications developed by amplifier 25 from those portions of the input signal which would otherwise lie above the threshold level of logarithmic amplifier 21. Diode 32 and its source of positive potential function as a coarse clipping circuit by eliminating those portions of the signal supplied to it which lie above a level approximately corresponding to the threshold level. The coarsely clipped signals and all signals having lesser amplitudes are then amplified by amplifier 26 to a convenient level at which the coarsely clipped signals may be clipped very accurately to a level corresponding to the threshold level. Diode 33 and its source of positive potential function as the fine clipping circuit. Wave shapes B and C shown in FIG. 1 at the anodes of diodes 32 and 33, respectively, represent the performances of the coarse and fine clipping circuits. Thus, the output of the second clipping circuit contains clipped signals corresponding to input signals equal in amplitude to the threshold level and all input signal having lesser amplitudes.

Amplifier 27 lineraly amplifies the signals passed by the second clipping circuit by such an amount that the amplification developed from the clipped signals will be equal in amplitude to the maximum value of the straight-line portion of the characteristic curve of logarithmic amplifier 21. The wave shape in FIG. 2*c* depicts this amplification function while the characteristc curve of FIG. 2*c* depicts the clipping function performed by the second clipping circuit. Other amplifications developed by amplifier 27 from signals having lesser amplitudes than the clipped signals will fall on different positions of the straight-line portion of the characteristic curve. The net result is that the amplifications of the signals passed by the second clipping circuit are now positioned on the straight-line portion of the characteristic curve of logarithmic amplifier 21 where as the signals from which these amplifications were developed were positioned on the jagged portion of the characteristic curve. In other words, the amplifications developed from signals lying below the threshhold level are now positioned on the usable portion of the characteristic curve. Thus, the output of logarithmic amplifier 21 contains logarithmic amplifications, over a wide frequency range, of input signals whose amplitudes lie below the threshhold level of the logarithmic amplifier. Obviously, this output will also contain logarithmic and nonlogarithmic amplifications of those portions of the input signals shown in FIG. 2*c* which even after amplification by amplifier 27, still lie below the threshhold level of logarithmic amplifier 21.

Amplifier 28 serves as a current amplifier for the amplifications developed by logarithmic amplifier 21 and supplies these amplifications to the output terminal 34. The D.-C. restorers 29, 30 and 31 again are only necessary if the coupling between the various stages in the second circuit means is A.-C. coupling.

The outputs from the first and second circuit means are effectively combined at terminal 34. Generally, the characteristics of logarithmic amplifiers 11 and 21 are substantially identical so that the output signals are of proper magnitudes when they are added together. Where, however, logarithmic amplifiers 11 and 21 have substantially different characteristics, the relative gains of amplifiers 17 and 28 may be adjusted to provide proper magnitude signals at terminal 34.

Considering wave shape A again, the second circuit means serve to develop logarithmic amplifications of those portions of wave shape A lying below the threshold level. While such logarithmic amplifications are being developed there is no output signal from the first circuit means since the first clipping circuit effectively prevents the passage of any amplifications, logarithmic or otherwise, developed from input signals lying below the threshold level. The first circuit means serve to logarithmically amplify those portions of wave shape A lying above the threshold level. While such logarithmic amplifications are being developed, the output signal from the second circuit means is constant and corresponds to an input signal equal to the threshold level. The additive effect is to develop logarithmic amplifications of the signal represented by wave shape A over an extended portion of its amplitude. As previously mentioned, the output of logarithmic amplifier 21 will contain non-logarithmic amplifications developed from the very small amplitude portions of wave shape A since these portions, even after amplification by amplifier 27, still lie below the threshold level of logarithmic amplifier 21. It has been found, however, that a broad-band many-decade logarithmic amplifier constructed in accordance with the present invention is effective to extend the amplitude range over which it will have a logarithmic characteristic for a wide frequency range by an additional two and one-half decades.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A broad-band many-decade logarithmic amplifier comprising:

means for supplying input signals;

first circuit means, including a first logarithmic amplifier having a characteristic which is logarithmic only over a relatively narrow frequency range for input signals below a particular level, responsive to said input signals for logarithmically amplifying input signals above said particular level;

second circuit means, including a second logarithmic amplifier, responsive to said input signals for logarithmically amplifying input signals below siad particular level;

and means for additively combining outputs from said first and second circuit means.

2. A broad-band many-decade logarithmic amplifier comprising:

means for supplying input signals;

first circuit means, including a first logarithmic amplifier having a characteristic which is logarithmic only over a relatively narrow frequency range for input signals below a particular level and logarithmic over a relatively wide frequency range for input signals above said particular level, responsive to said input signals for logarithmically amplifying input signals above said particular level over said relatively wide frequency range;

second circuit means, including a second logarithmic amplifier, responsive to said input signals for logarithmically amplifying input signals below said particular level over said relatively wide frequency range;

and means for additively combining the outputs from said first and second circuit means.

3. A broad-band many-decade logarithmic amplifier comprising:

means for supplying input signals;

first circuit means, including a first logarithmic amplifier having a characteristic which is logarithmic only over a relatively narrow frequency range for input signals below a particular level, responsive to said input signals for logarithmically amplifying input signals above said particular level;

second circuit means, including a second logarithmic amplifier, responsive to said input signals for linearly amplifying input signals below said particular level and for logarithmically amplifying said amplified input signals;

and means for combining outputs from said first and second circuit means.

4. A broad-band many-decade logarithmic amplifier comprising:

means for supplying input signals;

first circuit means, including a first logarithmic amplifier having a characteristic which is logarithmic only over a relatively narrow frequency range for input signals below a particular level and logarithmic over a relatively wide frequency range for input signals above said particular level, responsive to said input signals for logarithmically amplifying input signals above said particular level over said relatively wide frequency range;

second circuit means, including a second logarithmic amplifier, responsive to said input signals for linearly amplifying input signals below said particular level and for logarithmically amplifying said amplified input signals;

and means for combining the logarithmic amplifications of input signals above said particular level and the logarithmic amplifications of input signals below said particular level.

5. A broad-band many-decade logarithmic amplifier, comprising:

means for applying input signals;

a first logarithmic amplifier responsive to said input signals and having a characteristic which is logarithmic only over a relatively narrow frequency range for input signals below a particular level, for logarithmically amplifying said input signals;

first clipping circuit means coupled to said first logarithmic amplifier for clipping said logarithmically amplified input signals to remove logarithmic amplifications developed from input signals which are below said particular level;

second clipping circuit means coupled to said signal supplying means for clipping said input signals to remove input signals which are above said particular level;

means coupled to said second clipping circuit means for linearly amplifying the clipped input signals and all input signals having lesser amplitudes than said clipped input signals;

a second logarithmic amplifier coupled to said linear amplifying means for logarithmically amplifying the linear amplifications of said clipped input signals and said lesser amplitude signals;

and means for combining outputs from said first clipping means and said second logarithmic amplifier.

6. A broad-band many-decade logarithmic amplifier, comprising:

means for supplying input signals;

a first logarithmic amplifier responsive to said input signals and having a characteristic which is logarithmic only over a relatively narrow frequency range for input signals below a particular level and logarithmic over a relatively wide frequency range for input signals above said particular level, for logarithmically amplifying said input signals;

first clipping circuit means coupled to said first logarithmic amplifier for clipping said logarithmically amplified input signals to remove logarithmic amplifications developed from input signals which are below said particular level;

second clipping circuit means coupled to said signal supplying means for clipping said input signals to remove input signals which are above said particular level;

means coupled to said second clipping circuit means for linearly amplifying the clipped input signals and all input signals having lesser amplitudes than said clipped input signals;

a second logarithmic amplifier coupled to said linear amplifying means and having similar characteristics to said first logarithmic amplifier for logarithmically amplifying the linear amplifications of said clipped input signals and said lesser amplitude signals;

and means coupled to the output of said first clipping circuit means and to the output of said second logarithmic amplifier for combining the logarithmic amplifications of input signals which are above said particular level and the logarithmic amplifications of input signals which are below said particular level.

7. A broad-band many-decade logarithmic amplifier comprising:

means for supplying input signals;

a first logarithmic amplifier, including a diode connected across output terminals of a transistor, responsive to said input signals and having a characteristic which is logarithmic only over a relatively narrow frequency range for input signals below a particular level and logarithmic over a relatively wide frequency range for input signals above said particular level, for logarithmically amplifying said input signals;

first clipping circuit means coupled to said first logarithmic amplifier for clipping said logarithmically amplified input signals to remove logarithmic amplifications developed from input signals which are below said particular level;

second clipping circuit means coupled to said signal supplying means for clipping said input signals to remove input signals which are above said particular level;

means coupled to said second clipping circuit means for linearly amplifying the clipped input signals and all input signals having lesser amplitudes than said clipped input signals;

a second logarithmic amplifier coupled to said linear amplifying means and including a diode connected across output terminals of a transistor, and having similar characteristics to said first logarithmic amplifier, for logarithmically amplifying the linear amplifications of said clipped input signals and said lesser amplitude signals;

and means coupled to the output of said first clipping circuit means and to the output of said logarithmic amplifier for combining the logarithmic amplifications of input signals above said particular level and the logarithmic amplifications of input signals below said particular level.

References Cited by the Examiner

UNITED STATES PATENTS

| | | | |
|---|---|---|---|
| 3,108,224 | 10/1963 | Bradsell | 328—145 X |
| 3,109,103 | 10/1963 | Wilhelmsen | 328—142 X |

OTHER REFERENCES

"A New Type Instantaneous Logarithmic Wide-Band Amplifier," distributed by Office of Technical Services, U.S. Dept. of Comm. PB121485, Bureau of Ship Translation 592, May 1955, 13 pages.

ARTHUR GAUSS, *Primary Examiner.*